Patented Oct. 8, 1940

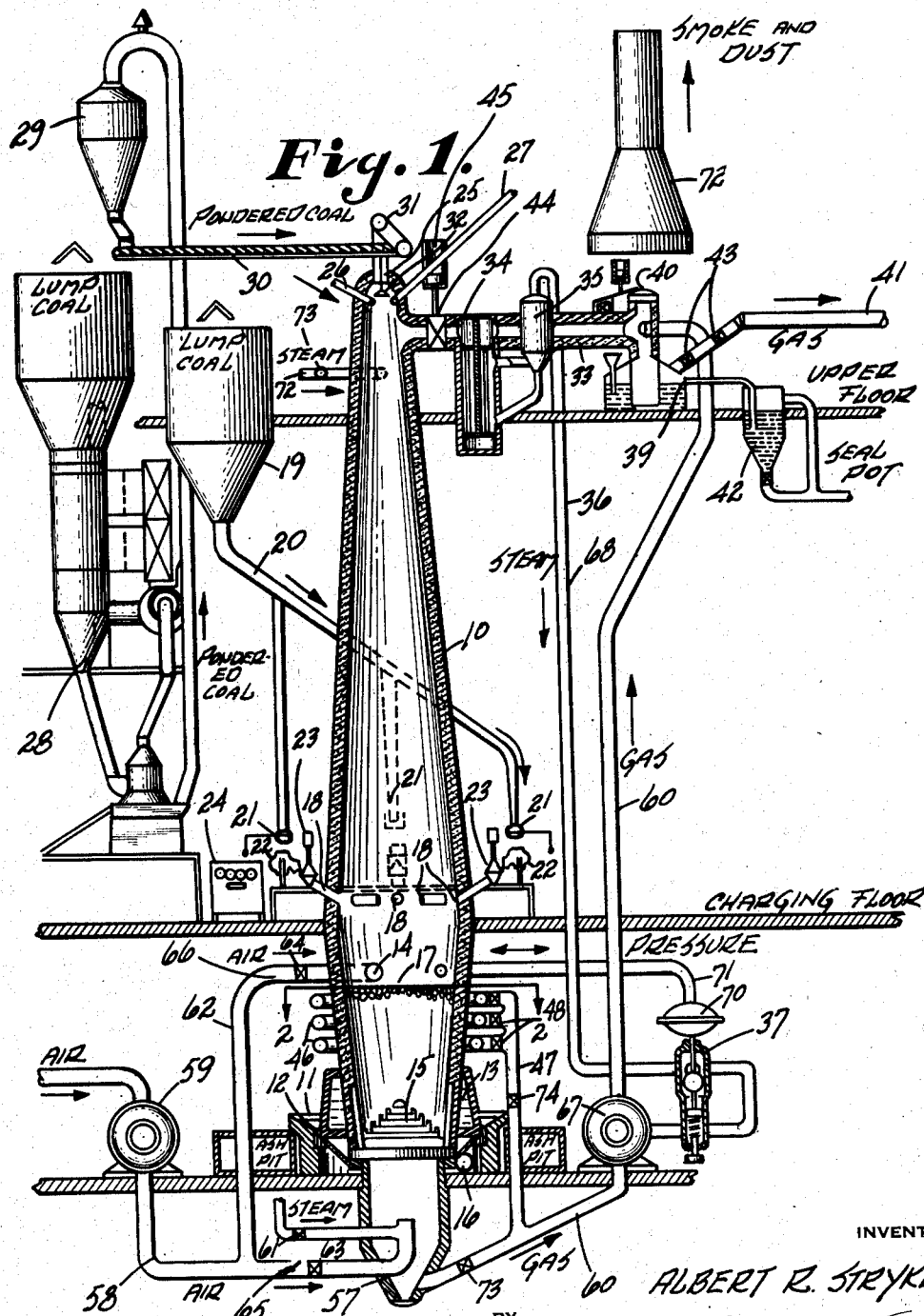

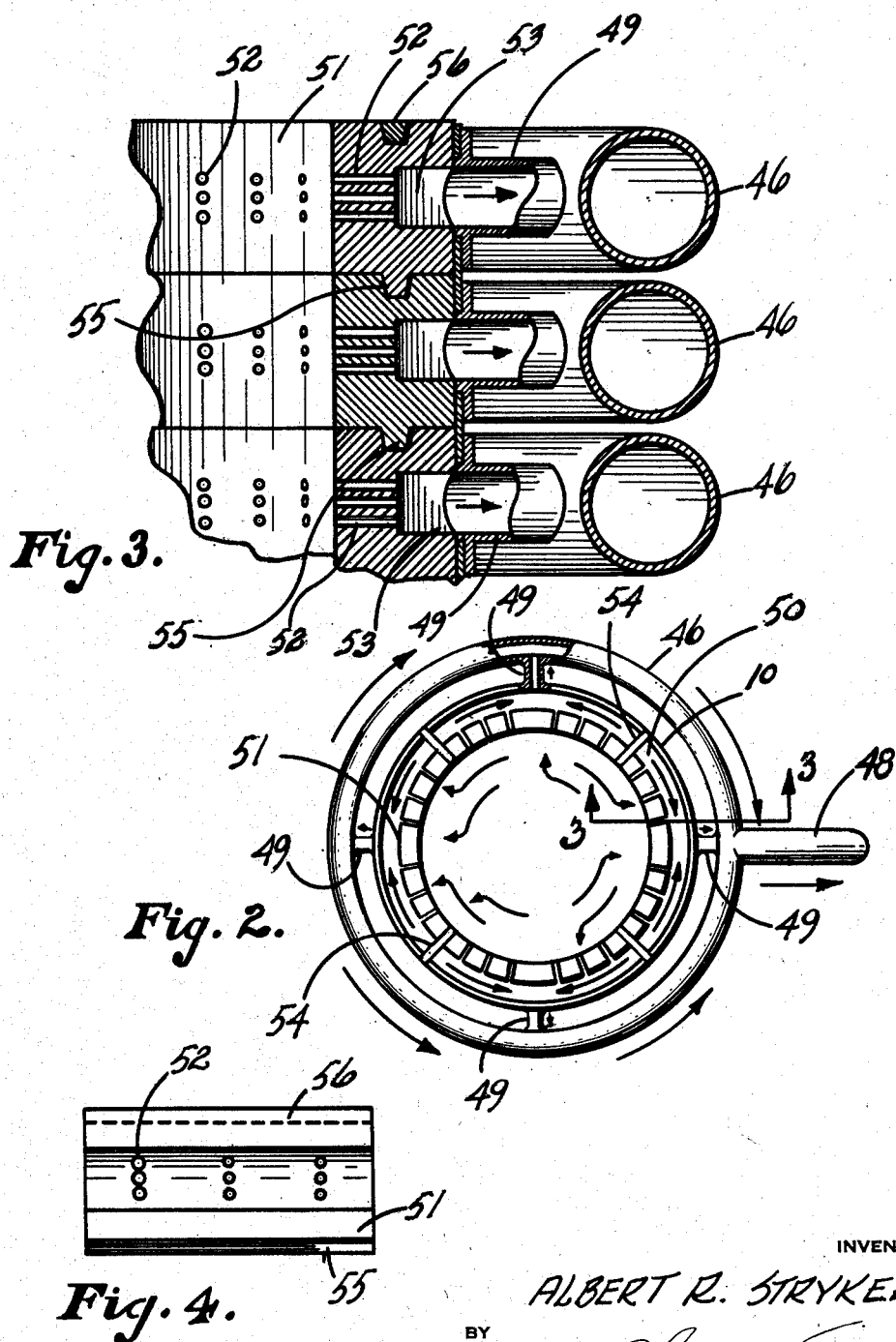

2,216,792

UNITED STATES PATENT OFFICE 2,216,792

GAS MAKING APPARATUS

Albert R. Stryker, Lawrenceburg, Ind., assignor of one-half to Chester Tietig, Covington, Ky.

Original application September 30, 1935, Serial No. 42,784, now Patent No. 2,126,150, dated August 9, 1938. Divided and this application August 25, 1937, Serial No. 160,871

6 Claims. (Cl. 48—76)

This invention relates to a process and apparatus for producing and reforming combustible gases.

Among the objects of the invention are to provide a process and apparatus for making any gas of predetermined composition and heating value from any carbonaceous volatilizable and combustible material that is capable of being very finely divided, throughout a wide range of hydrogen content of such gases.

One object is to provide a process and apparatus for volatilizing hydrocarbonaceous matter for reforming the resulting gas in the same apparatus.

Another object is to provide a process and apparatus in which the rate and extent of reformation of the gas is under exact control.

Another object is to provide a process in which the carbon produced by reformation of gas is deposited in an advantageous position for its utilization in the further production of gas.

Another object is to provide a process for producing industrially pure hydrogen from hydrocarbon raw material.

Another object is to utilize for such certain low grade carbonaceous materials which will be hereinafter mentioned and which have not heretofore been utilizable to produce gases of high heating value or high hydrogen content.

My apparatus is an improvement on the subject matter of my U. S. Patent #1,855,034 and the improvement comprises means for obtaining partially or completely reformed gases from various levels of the solid fuel bed, which levels can be easily selected.

Briefly stated, my process comprises passing finely divided volatilizable and/or combustible hydrocarbonaceous material through a highly heated zone then through an incandescent bed of solid fuel and cracking the volatile constituents therein and then leading out the gas desired from that level of the fuel bed at which it is formed.

Referring to the accompanying drawings,

Fig. 1 is a somewhat diagrammatic elevation, partly in section, of a producer-retort according to my invention, and the accessories necessary for its operation.

Fig. 2 is a horizontal cross section of the producer-retort along the line 2—2 of Fig. 1 and shows the walls of the fuel zone.

Fig. 3 is a detail in vertical section of the producer-retort taken on the line 3—3 of Fig. 2.

Fig. 4 is a front elevation of one of the pierced refractory bricks used at the fuel zone for leading off the gas.

Referring again to Fig. 1, 10 is a retort shell or combustion tower which also serves as the main member of a gas producer as well as a retort. 10 and its accessories are therefore hereinafter referred to as a producer-retort. The shell 10 has preferably the high, double conical shape shown and in practice may be 80 to 90 feet high and 11 feet in diameter at its widest zone tapering to about 4 feet in diameter at the top. The invention is not limited to such dimensions. The shell is supported by three outside legs which are not shown. Support of this character leaves a free space 11 between the bottom of the shell and a circular wall 12 which surrounds it at the base, and also allows free communication between the inside of the shell and the space within wall 12, which in operation is filled with water. Shell 10 is of steel construction and is refractory lined except near the bottom, where there is a zone that is encircled by a water jacket 13. A bed of fuel 17, either coal or coke is carried in the lower conical end, up to the line 2—2 i. e. just under an air inlet 14 tangential to the shell. At the base of this shell there is a rotary eccentric grate 15, driven by an electric motor 16. The ashes which fall into the space 11 are pushed over the rim of the circular wall 12 and into an ash pit as the grate revolves. No novelty is claimed for the rotary grate or ash handling arrangement, these being conventional in the United Gas Improvement Company's pressure producer shown and described in Haslam and Russel "Fuels and their Combustion" (1926) page 487. An external view is shown in "Gas Engineering and Appliance Catalog" (1926) Robbins Publishing Co., Inc. page 127. The tangential air inlet 14 is as shown in Fig. 3 of Patent #1,855,034.

Shell 10 is provided with a plurality of inclined ports 18 for charging and maintaining the fuel bed. These are fed with coal or coke from a hopper 19 from which a branched delivery pipe 20 leads which ends in a plurality of dump gates 21. From the latter, charging buckets 22 can be filled and these can be dumped through the ports 18 after hydraulically controlled valves 23 covering the ports are opened. A control board 24 is provided for operating these valves. Such fuel as is charged in thru ports 18 for the purpose of establishing and maintaining the fuel bed, is hereinafter called "maintenance fuel."

At the top of shell 10 is a port 25 thru which solid fuel intended to produce the gas is charged. Such fuel may be anything of a hydrocarbonaceous nature and need not be solid. If it is liquid it is charged in thru pipe 26; if it is gaseous thru pipe 27. One or more kinds of fuel can be here introduced together or intermittently or singly. The fuel introduced at the top of the retort for operating the process, I call "operating fuel."

At the upper left side of Fig. 1 there is shown a coal powdering plant 28 which is conventional. It has a delivery hopper 29 for coal dust, which dust is transferred to the producer-retort by means of screw conveyor 30; 31 is a motor driven spreader. As the dust falls it encounters revolving spreader 32 which can also serve as a valve to close ports 25 when desired. Below the top of shell 10 there is an offtake 33 which runs thru a waste heat boiler 34 having a steam drum 35 and a steam delivery pipe 36 in which there is a diaphragm regulating valve 37, said pipe 36 carrying steam to a turbine exhauster 67. Offtake 33 runs to a wash box 39 having an outwardly opening hydraulically operated flap valve 40, a gas delivery pipe 41 and a water repenlishing and dust disposal system 42. Suitable valves 43 may be arranged in the gas delivery pipe.

In the offtake 33 between the top of shell 10 and waste heat boiler 34, there is a hot valve 44 i. e. a valve adapted to operate at high temperatures. It is controlled by a hydraulic cylinder and piston 45 and its function is to close off the offtake 33 during the gas making step of the process.

About the shell 10 at the upper part of the zone of maintenance fuel there is a plurality of circular manifolds 46. Each of these connect to a downcoming manifold conduit 47 and each circular manifold may be shut off from the latter by a valve 48. Each circular manifold taps the shell 10 at four equidistant points. The circular manifolds may be of any selected number, but each is at a different level and connected by means of a short extension 49 to a gas channel 50 which is within the shell 10 at a point below the top of the fuel bed. The inner wall of channel 50 is defined by a circular row or rows of the pierced refractory brick 51, preferably of silicon carbide, one of which is shown in front elevation in Fig. 4 and several in section in Fig. 3 and in plan in Fig. 2.

Each brick or block 51 is provided with three rows of three transverse holes 52. The holes communicate with a longitudinal channel 53 which extends along the rear of the block, this channel constituting a means whereby the gas from the holes 52 may be collected into a single stream. In my apparatus channel 50 may be identical with channel 53 or it may be and preferably in a channel additional thereto but in free communication therewith at all points. Suitable dividing blocks 54 are shown which may also be employed to support the brickwork from the shell 10 and these supports may be of any suitable form. The brickwork is, however, provided with tongues 55 and grooves 56 which contribute to its stability.

The depth of the gas offtakes below the level of the fuel bed is of importance. If a bed maintenance fuel of 9 to 11 feet deep is used, the top offtake, i. e. the top rows of pierced brick should be from 2 to 3 feet below the top of the fuel bed, the second from 3 to 5 feet below and the third from 5 to 7 feet below.

Beneath the grate 15 there is a generally conical inverted bell 57 into which an air delivery pipe 58 from a blower 59 and a gas exit pipe 60 are fitted. There is also a steam supply pipe 61 fitted into the exit end of the air pipe 58. The latter pipe has a branch 62 which connects with the tangential air inlet 14 above the fuel bed. Both air pipes are provided with shut off valves 63 and 64 respectively and butterflies 65 and 66 respectively.

Gas delivery pipe 60 runs to a steam-turbine driven exhauster 67 and before it reaches the latter, it is joined by gas delivery pipe 47 from the manifolds 46. From the exhauster 67 a pipe 60 extends to the wash box 39.

Steam for driving the exhauster 67 is supplied from the steam drum 35 of waste-heat boiler 34 thru a pipe 68 in which there is a diaphragm-controlled spring loaded regulating valve 37 shown in exaggerated size on Fig. 1. This valve is conventional and may be either the one sold by the Chaplin-Fulton Mfg. Co. of Pittsburgh, Pa., under the name of "Duplex steam control for gas producers" or that made by the Fisher Governor Co. of Marshalltown, Iowa, as type 1560—"Low pressure diaphragm actuated valve."

From the diaphragm chamber 70 of valve 37 a pressure-communication pipe 71 runs to the interior of shell 10 to a point just above the fuel bed. The valve 37 is so arranged that the interior of shell 10 shall maintain as closely as possible a minus pressure of 0.2 inch of water. This valve may be varied at the will of the operator, but is recommended for ordinary operation. The valve regulates the steam supply to the exhauster turbine so that if the pressure in shell 10 rises to an undesired value, more steam will be admitted to the turbine, the exhauster will increase its speed and consequently lower the pressure within the shell 10.

A steam supply pipe 72 having a valve 73 is arranged near the top of shell 10 for a purpose later to be described.

While my process may be carried out in other apparatus, when it is executed in that shown the operation is as follows:

Lump fuel, preferably coal, but permissible coke is first charged into the producer-retort and ignited. The degree of subdivision of this fuel should be between pea (½" to ¾") cubes and furnace lump (4" to 6") cubes. After ignition the air blast is turned on from pipe 58 and 62 and the charging process is continued until the fuel bed reaches the desired level, which is thereafter maintained. Secondary air fed in through tangential opening 14 is limited in amount so as to be only sufficient to burn the CO above the fuel bed to $CO_2$. Heating is thus continued until the producer retort above the fuel bed is heated at least in part to about 1400° F. plus 400 or minus 100°. During this operation valves 44 and 40 are open permitting smoke to be vented off thru a stack 72 without going thru the water in the wash box. As soon as ash formation or clinker formation begins electric motor 16 is started, thereby rotating eccentric grate 15 so as to catch and crush clinkers between the grate and the sell 10. The scraper blade (not shown) transfers ash from the space between the ring 12 and the shell 10 to an annular ash pit surrounding same.

Enough steam has now accumulated in waste heat boiler 34 to operate exhauster 67 thru its turbine until the next "blow" or heating period. If the quantity of steam should be insufficient auxiliary energy may be supplied from without the system. Exhauster 67 is now started, blower 59 stopped, valves 63, 64 and 44 closed, thereby automatically closing valve 40 and all valves in the gas discharge lines, 47, 60 and 41 are opened;

those in the latter line at least to some considerable extent.

Finely divided operating fuel is now fed from conveyor 30, thru opening 25 into the top of the producer-retort and allowed to fall as freely as it may but still under influence of the suction created by exhauster 61, to the top of the fuel bed. Carbonization and liberation of gas takes place during the descent and after the particles have come to rest on the surface of the fuel bed or in its interstices. Charging of operating fuel is so conducted that a minimum of air is admitted with the fuel, i. e., the sealing and revolving spreading bell 32 is raised to a point that will allow continuous dropping into the producer-retort of the desired amount of fuel with little or no air.

The level of the fuel bed from which the gas is to be taken is selected by opening the valves 48 at its levels desired to withdraw gas thru the holes and channels in the pierced bricks or opening a valve 73 in line 60. Any desired blend of gas may be made by regulating valves 48 or 73 and if desired also by the use of a valve 74 in pipe 47. The lower the level selected, the higher will be the hydrogen content of the gas and if the entire depth of bed is utilized by withdrawing gas exclusively from the bell 57, industrially pure hydrogen will be the product. In any case the gas output passed thru in Fig. 2 a portion of pipe 60 below the exhauster and the remainder of said pipe above the exhauster to be washed in wash box 39 and to make its exit from pipe 41.

The operating fuel may be any kind of coal, anthracite, bituminous, lignite, mine refuse and off season stocks. It may also be petroleum oil or its fractions including fuel oil, gas oil, still bottoms, gasoline, kerosene, butane, ethylene and others. Natural gas and refinery gas may be used since, while these substances undergo a diminution of heating value when put thru my process, they also undergo a considerable permanent expansion in volume. Wood fiber, straw, corn stalks, cocoanut, cottonseed oil, animal fats, fatty acids, residues from fatty acid distillation, spoiled fats and any hydrocarbonaceous material capable of being finely divided to particles of say 1/8" square or smaller, can be used. The term "hydrocarbonaceous" as I use it includes fatty carbohydrates.

If freedom from by-products (tars, light oil, etc.) which might clog city gas lines, is desired, the lower level of the fuel bed should be selected as the source of the gas. The lower the level selected however, the lower will be the heating value of the gas obtained, the greater freedom from by-products, the higher the hydrogen content and the greater the permanent gas volume.

For the production of city gas, of highest heating value, the preferred method would be to take gas only from the top offtake. For a gas of fairly low heating value but carrying little or no by-products, gas from one or more of the middle or lower side offtakes is to be chosen. For the production of all hydrogen for process work or for mixing with other gases for transportation, the offtake below the grate is to be selected.

In the case of reformation of gaseous fuels, with a temperature of 1500° F. at first or top offtake a 650 B. t. u. coal gas may be cracked back to 600 B. t. u.

With the same temperature at first offtake and 1700° F. at the second, a (650 B. t. u.) gas may be cracked back to 500 B. t. u.

With the above temperatures at the first two offtakes and 2000° F. (partially in the incandescent zone) at the third, a 650 B. t. u. gas may be cracked back to 400 B. t. u.

Lastly, by drawing the gas thru the entire incandescent zone (2600°–2800° F.) thru the bottom offtake, the gas may be completely cracked to approximately 325 B. t. u. which is an indication of its nearly pure hydrogen composition.

While the operation of my apparatus is continuous during the gas making period, that period lasts only until there is insufficient heat left in the upper walls of the producer-retort to drive off the volatile matter from the operating fuel dropped past them. When this occurs, the exhauster 67 is either shut down or valved off. Valves 74 and 73 are preferably closed, ports 18 and 25 are closed and hot valve 44 is opened. Valves 43 are closed. Blower 39 is started and air fed to the producer-retort both above and below the fuel bed. The tangential inclination of port 14 causes the air to have a scurfing action on the walls of the retort and thus any carbon clinging to the retort walls is efficiently loosened. The hot gases produced by the combustion find their exit thru the offtake or leading off means 33 and in doing so heat the water in wasteheat boiler 34 and so to wash box 39. Here, because the gases are under considerable pressure, hydraulically operated valve 40 opens or is opened manually and the gases with accompanying smoke and dust, pass up the stack 72.

A number of common and well known types and combinations of types of gases may be produced in addition to the gases hereinbefore mentioned. The producer portion of the apparatus may make either producer gas or a mixed producer and water gas independently of or in combination with partially or wholly reformed hydrocarbon gas, by blowing air only or air and steam through air inlet 58 and steam supply line 61. All other connections remain closed with the exception of offtake valve and offtake pipe 33 permitting a free flow of producer gas to the washbox.

Straight blue gas or combinations of blue gas, producer gas and partially or wholly reformed gas may be produced by passing steam only through the heated fuel bed through steam supply line 61, and blue gas thus generated is removed to the washbox, through offtake 33 or steam may be admitted to the upper portion of the retort through steam connection 72 passing downwardly through to the fuel bed and leaving the gas offtake below the grate and allow to flow under its own pressure through exhauster 67 and into pipe 60 to the washbox.

Oil gas may also be produced by spraying oil into the upper reaches of the heated retort through pipe 26. With hot valve 44 open and all other connections closed the oil gas thus produced passed through the washbox under its own pressure.

Oil gas can be further produced and utilized to carburett or enrich producer gas or blue gas before described.

It is evident that if any of the gases described or any combination of gases described can be utilized either separately or in combination with the process of cracking hydrocarbon gas that carbon deposited in the fuel bed due to cracking and also residues from solid operating fuels may be utilized for the production of gas or merely for the heating of the retort.

Due to the fact that secondary air blast connection 14 is tangential to the shell of the retort and a swirling motion is imparted to the air it is possible properly to manipulate butterfly valves 65 and 66 (after ignition is attained above the fuel bed) to pick up solid residue deposited on the top of the fuel bed after a gas "run" and burn the finely divided fuel within the retort much the same as firing a boiler with powdered fuel. The products of combustion and ash leave through the offtake 33 and are vented to the air through stack 72.

This application is a division of my co-pending application Serial No. 42,784 filed September 30, 1935, for Process for making gas, now Patent No. 2,126,150, issued August 9, 1938.

I claim as my invention:

1. In combination in a gas producing apparatus a producer retort means supplying same with maintenance fuel, means for supplying same with finely divided operating fuel from the top thereof, courses of perforated refractory bricks horizontally disposed to form a zone within said producer retort, said zone enclosing the region of the bed of said maintenance fuel, the perforations in said bricks being in communication with the interior of said producer retort, piping connected to each course of said bricks for withdrawing gas from a plurality of regions below the level of the top of said maintenance fuel selectively and from the sides thereof, piping for withdrawing gas from below the entire body of maintenance fuel, an exhauster for providing suction in all of said piping and means for continuously removing ash from said producer retort.

2. In combination in a gas making apparatus a producer retort of the general shape generated by putting the frustra of two cones base to base, means for introducing into the top thereof a supply of finely divided fuel, means for maintaining a bed of lump fuel at least partially at incandescence in the lower portion of said producer retort, means for continuously removing ash in solid form from the bottom, a plurality of courses of refractory bricks within said producer retort about the zone occupied by the bed of operating fuel, each of said bricks having openings communicating with the exterior of said producer retort, conduit means in communication with said courses of bricks for withdrawing gas downwardly and from the sides of said fuel bed selectively in regard to the level of withdrawal, means for creating suction with said conduit means and means for withdrawing gas from below the level of the entire fuel bed of maintenance fuel.

3. The combination comprising a producer retort, means for introducing finely divided fuel in a stream at the top thereof, means also at the top thereof for leading off products of combustion from within the retort, a hot-valve in the latter means, a wash box at the end of said leading off means, means comprising a plurality of courses of refractory bricks having transverse channels disposed within said producer retort to form a zone about the lower portion thereof, a plurality of circular conduits encircling said producer thereof at the level of said refractory brick zone communicating with the interior of said producer retort through the channels of said bricks, means for selectively applying suction to one or more of said circular conduits and courses of bricks with which said manifolds are respectively in free communication to remove combustible gas from said producer retort from various levels thereof, means for delivering said combustible gas to said wash box, a waste heat boiler in said leading off means, means for supplying steam from said waste heat boiler to said gas withdrawing means and means governed by the pressure existing above the fuel bed in the producer retort for varying the steam supply furnished to the gas withdrawing means to constrain the latter to maintaining a slight vacuum within the producer retort above the fuel bed.

4. The combination which comprises a refractory brick-lined producer-retort of the general shape generated by placing the frustra of two cones base to base, means for charging lump fuel into the lower portion thereof, means for supplying an air-blast to a bed of said lump fuel and to that portion of the interior of said producer retort which is above the top level of said fuel bed, means at the top of said producer retort for introducing and uniformly distributing finely divided fuel to the interior of said producer retort, means also at the top for leading off products of combustion, a continually revoluble eccentric grate within said producer retort and adjacent to the bottom thereof, a plurality of courses of transversely pierced refractory brick lining the interior of the producer retort which is above the top level of said fuel bed, gas channels between said pierced brick and a shell of said producer retort, a plurality of manifolds at various levels encircling said retort and communicating with said gas channels, valves between said manifolds and said gas channels, an exhauster connected to create suction in said manifolds and to withdraw gas from the fuel bed of said producer-retort through such bricks as are in communication with an open manifold, a turbine driving said exhauster, a bell below said grate, suitable valve piping for selectively withdrawing gas from said fuel bed below said bell by the agency of said exhauster, a hot-valve in said leading off means at the top of the producer retort, a waste heat boiler in said leading off means, gas washing means at the end of said leading off means, a steam supply pipe from said waste heat boiler to said turbine, a diaphragm regulating-valve in said steam supply pipe and a connection between said valve and the interior of said producer retort whereby to regulate the steam flowing through said steam supply pipe by means of the pressure prevailing within said producer retort to maintain a slight vacuum therein above the fuel bed.

5. In a gas producer-retort, a fuel bed zone, courses of refractory brick lining said zone, substantially each of said brick being provided with transverse channels for the withdrawal of gas from said zone, a plurality of gas channels encircling each of said courses of brick and being in communication with the interior of said retort through said brick, a plurality of dividing blocks at intervals in the courses of said refractory bricks, said blocks being adapted to block off the refractory courses into a plurality of suction zones communicating with a common gas channel, a plurality of circular manifolds encircling said producer retort at various levels, each manifold communicating with one gas channel and one course of refractory brick, piping providing communication of each manifold with a suction means, a valve in each suction pipe, where gas may be selectively sucked from a selected level or levels of the fuel bed, an exhauster connected to said piping, a driving means also connected to said exhauster, said means being adapted to withdraw gas from below the bottom of said fuel bed, means for providing said producer-retort with a semi-continuous stream of finely divided operating fuel from above the level of the fuel bed, means for withdrawing products of combustion from said producer retort, means for blasting said producer retort with air and means for selectively opening or closing the exhausting means for the products of combustion.

6. An apparatus for the gasification of solid fuels comprising a vertical combustion tower lined with heat refractory material and tapered downwardly and inwardly adjacent its lower end, an inlet at the top of said tower for the introduction of solid fuel, an outlet opening through a side wall of the tower adjacent its upper end for removing gas from the tower, a rotary grate arranged adjacent the bottom of the tower for continuously crushing and removing ashes therefrom, an air inlet and a steam inlet both located below the grate for introducing air and steam into the tower through the grate, valves for opening and closing said air and steam inlets, a manifold conduit arranged exteriorly of and adjacent the tower, branch pipes providing communication between the manifold conduit and the interior of the tower, said branch pipes passing through the wall of the tower at circumferentially spaced points about the tower and arranged in a plurality of series, each series of pipes being horizontally disposed at a different elevation and all of said pipes communicating with the tower below the level of the bed of fuel normally contained within the tower, and means for selectively regulating communication between the interior of the tower and the manifold conduit through each of the series of branch pipes located at any desired level.

ALBERT R. STRYKER.